Patented Oct. 9, 1951

2,570,788

UNITED STATES PATENT OFFICE 2,570,788

SYNTHETIC LUBRICANTS

John J. Giammaria, Woodbury, N. J., assignor to Socony-Vacuum Oil Company, Incorporated, a corporation of New York No Drawing. Application February 17, 1948, Serial No. 9,002

5 Claims. (Cl. 260—485)

This invention relates to new and improved synthetic lubricants and to a method for their manufacture. It also includes a method of lubricating relatively moving surfaces by maintaining a film consisting essentially of such synthetic lubricants therebetween. More specifically this invention relates to certain synthetic lubricants prepared by copolymerizing esters of polybasic alpha, beta, unsaturated acids with certain vinyl compounds in specified proportions.

In the sense in which "vinyl compounds" is used in this specification it includes aliphatic 1-olefins, styrene, vinyl acetate and other vinyl esters. The term "alpha olefins" will be used to designate olefins which do not contain ring structures or ester linkages.

Prior to this invention styrene and vinyl acetate have been reacted with esters of alpha, beta, unsaturated polybasic acids, but in different proportions and by different methods than here contemplated, thereby resulting in quite different products.

In accordance with the present invention, and in order to produce the desirable synthetic lubricants of the present invention, it has been found necessary to use diesters derived from polybasic alpha, beta, unsaturated acids and straight-chain, primary, aliphatic alcohols containing from 1 to about 18 carbon atoms. Branched-chain alcohols may be used but are not preferred.

In general, it is preferred to use normal aliphatic alcohols containing not less than 4 nor more than 10 carbon atoms per molecule and to react these with maleic acid or maleic anhydride to form the ester. Many standard procedures are known for the preparation of such esters, such for example as the heating of the acid or anhydride with the alcohol in the presence of small amounts of an acid catalyst such as concentrated sulphuric acid or paratoluene sulphonic acid. In these reactions a solvent is usually provided to serve as a carrier for the removal of water formed during the esterification. Toluene and xylene are commonly used solvents for this purpose.

Since the present invention does not lie in the preparation of the ester, it may be prepared in any desired manner, the essential requirement being that it be a diester of an alpha, beta, unsaturated, polybasic acid and that the ester chains be straight, or substantially so, and that each contain from 1 to 18 carbon atoms. The ester chains need not be the same length. Preferably the acid is maleic and the chains are not less than 4 nor more than 10 carbon atoms in length, or at least the average length of the two chains is between these limits.

The vinyl compound to be reacted with the ester will, of course, contain at least 2 carbon atoms and should preferably contain no more than 18 carbon atoms. Thus vinyl acetate, propionate and butyrate, styrene and alpha methyl styrene, ethylene, propylene, butylene, octene-1, dodecene-1 and tetradecene-1 are all useful. Vinyl acetate, styrene and alpha olefins containing not more than 10 carbon atoms per molecule are preferred.

The proportion of ester to vinyl compound may range from 1 mol of the ester to 0.05 mol of the vinyl compound, to 1 mol of the ester to 1.0 mol of the vinyl compound. Preferably, however, no less than 0.1 mol of the vinyl compound and no more than 0.5 mol of the vinyl compound will be reacted with 1 mol of the ester. When alpha olefins are used as the vinyl compounds, generally no more than 0.25 to 0.5 mol per mol of ester will enter the reaction. The remainder will be recovered unreacted.

The copolymerization may be performed in the presence of an organic peroxide such as benzoyl peroxide at temperatures ranging from about 50° C. to about 150° C. A period of time ranging from 1 to 10 hours is generally required. An inert atmosphere such as nitrogen is preferred during the reaction. The use of 0.5% to 2.0% benzoyl peroxide at a temperature of 100° C. to 125° C. and a reaction time of 1 to 4 hours is generally satisfactory. When gaseous monomers such as ethylene, propylene or butene-1 are employed, the reaction must be conducted under pressure and may be run in an autoclave. An excess of aliphatic 1-olefin may usually be present without any more than 0.25 to 0.5 mol entering into the reaction with the ester.

The copolymerization of an ester of a polybasic alpha, beta, unsaturated acid with one of the more active vinyl monomers furnishes a convenient method of regulating and improving the properties of the former as a lubricant. For example, di-n-octyl maleate itself has a kinematic viscosity at 210° F. of 2.46 centistokes. By copolymerizing one mol of this ester with 0.1 mol to 0.3 mol of vinyl acetate, the viscosity is increased, ranging from 5.0 to about 15.0 centistokes at 210° F. Furthermore, the vistcosity index is markedly increased and the pour point is lowered.

The preference for the use of normal aliphatic alcohols of 4 to 10 carbon atoms in preparing the ester of the polybasic alpha, beta, unsaturated acid, expressed above, is based primarily upon the fact that copolymerization of such esters with the vinyl compounds of this invention yields oils of very low pour point as well as very high viscosity index.

The synthetic lubricants of this invention apparently consist of a mixture of ester copolymer, ester polymer and unpolymerized ester. Any excess of vinyl compound is generally removed. These synthetic lubricants are clear, light colored, homogeneous liquids. When lower esters of polybasic alpha, beta, unsaturated acids are used, as for example, di-n-butyl maleate, it may be desirable to remove the unpolymerized ester by distillation, especially if an oil of high flash point is desired. However, when such esters are prepared from higher alcohols, such as the di-n-octyl esters, the ester itself has a sufficiently high flash point for most applications. The oxidation stability of these synthetic oils may be further improved by the addition of a small amount of an oxidation inhibitor. Other addition agents known to improve mineral lubricating oils, as to pour point, extreme pressure lubricating qualities, detergency, rust prevention, or the like, may be added to the oils of this invention and may be expected to accomplish similar improvements therein.

The synthetic oils described herein may be used in a variety of applications since their properties may be easily varied by the choice of types and proportions of monomers to be copolymerized. They may be used as lubricants for internal combustion engines, as turbine oils, as refrigerator oils, as hydraulic fluids and, in general, for any application which requires a lubricant of extremely low pour point and high viscosity index. They may be blended with mineral lubricating oils since they are miscible in all proportions. Other applications include use as plasticizers and leather lubricants.

While any polybasic alpha, beta, unsaturated acid or anhydride may be used in the preparation of the esters of this application, it is preferred to use maleic anhydride because it is readily available and because the final products, when made from maleic esters, show particularly good oxidation stability, comparable to or better than a straight mineral oil of the same viscosity range.

The proportion of vinyl compound to be used may be varied between the limits given hereinbefore to vary the viscosity of the final synthetic oil product. In general, the use of 0.1 to 0.5 mol of the vinyl compound to 1 mol of the maleic ester will yield oils of a viscosity range suitable for most applications. For producing oils in the motor oil range of S. A. E. 10 to S. A. E. 30, 1.0 mol of any of the preferred maleic esters may be copolymerized with approximately 0.25 mol of any of the above mentioned vinyl compounds.

Further details and advantages of this invention will be apparent from the following specific examples:

EXAMPLE I

Fifty-one grams of di-n-octyl maleate, 3.2 g. of freshly distilled vinyl acetate and 0.54 g. of benzoyl peroxide were mixed and slowly heated, while stirring, to 125° C. After heating for ½ hour at this temperature, the viscous oil was dissolved in benzene, transferred to a distilling flask and the solvent and any unreacted vinyl acetate were removed by distillation, heating to 150° C. at 150 mm. pressure. The oil was allowed to cool to room temperature and filtered through a layer of adsorptive clay. Fifty-four grams of a light yellow, clear, viscous oil were obtained.

EXAMPLE II

Sixty-eight grams of di-n-octyl fumarate, 3.0 g. of freshly distilled vinyl acetate and 0.71 g. of benzoyl peroxide were mixed and slowly heated, while stirring, to 100° C. Although heating was discontinued at this point, the temperature rose to 125° C. As the temperature began to drop, heat was again applied and a temperature of 125° C. was maintained for 1 hour. The mixture was purified as described in Example I. Seventy-one g. of a light colored, clear, viscous oil were obtained.

EXAMPLE III

One hundred and fourteen grams of di-n-butyl maleate, 11.0 g. of freshly distilled vinyl acetate and 1.25 g. of benzoyl peroxide were mixed and slowly heated, while stirring, to 125° C. After heating for 2 hours at this temperature, the mixture was purified as in Example I.

EXAMPLE IV

Three hundred and forty grams of di-n-octyl maleate, 26.0 g. of freshly distilled styrene and 3.66 g. of benzoyl peroxide were mixed and slowly heated, while stirring, to 110° C. and held at this temperature for 1 hour. The oil was transferred to a distilling flask and heated to 280° C. at 1 mm. pressure at which point some unpolymerized maleic ester was distilled. The residual oil was cooled and filtered through a layer of adsorptive clay. Three hundred and forty-one g. of a clear, viscous oil were obtained.

EXAMPLE V

Fifty-seven g. of di-n-butyl maleate, 13.0 g. of freshly distilled styrene and 0.70 g. of benzoyl peroxide were mixed and slowly heated, while stirring, to 125° C. This temperature was held for two hours. The mixture was purified as in Example I, yielding 63.0 g. of a clear, viscous oil.

EXAMPLE VI

One hundred and twenty-eight grams of di-n-amyl maleate, 47.0 g. of propylene and 1.73 g. of benzoyl peroxide were placed in a stainless steel bomb and heated at 120° C. for four hours. The mixture was removed from the bomb by dissolving in benzene. The solvent was then removed by distillation. The residual oil was cooled and filtered through a layer of adsorptive clay yielding 136.0 g. of a light colored, clear, viscous oil.

EXAMPLE VII

One hundred and fourteen grams of di-n-octyl maleate and 1.0 g. of benzoyl peroxide were placed in a 500 cc. stainless steel bomb which was then pressured to 400 lbs./sq. in. with ethylene. The temperature was then raised to 120° C. and held for four hours. The mixture was cooled and purified as in Example VI. One hundred and eighteen grams of a light colored, clear, viscous oil were obtained.

EXAMPLE VIII

Eighty-five grams of di-n-octyl maleate, 29.5 g. of octene-1, and 1.1 g. of benzoyl peroxide were mixed and slowly heated to 125° C. After heating at this temperature for 2½ hours, the mixture was purified as in Example I, unreacted octene-1 being removed by distillation to 175° C. under 150 mm. pressure. Ninety-five grams of a very light colored, clear, viscous oil were obtained.

EXAMPLE IX

One hundred and thirteen grams of di-n-dodecyl maleate, 5.5 g. of freshly distilled vinyl acetate and 1.19 g. of benzoyl peroxide were reacted as in Example III.

The properties of the ester copolymers as lubricants are listed in Table I.

Table I

| Example Number | A. S. T. M. Pour Point, °F. | Kinematic Viscosity | | Viscosity Index |
|---|---|---|---|---|
| | | 100° F. | 210° F. | |
| I | <−65 | 83.31 | 13.69 | 141.8 |
| II | −15 | 421.40 | 48.97 | 129.4 |
| III | <−65 | 43.51 | 8.74 | 155.0 |
| IV | <−30 | 46.85 | 8.65 | 147.0 |
| V | −60 | 49.62 | 9.09 | 146.5 |
| VI | <−65 | 40.80 | 8.20 | 152.6 |
| VII | <−65 | 47.97 | 8.85 | 147.7 |
| VIII | <−65 | 52.01 | 9.45 | 146.6 |
| IX | +25 | 129.90 | 18.68 | 136.3 |

The oxidation stability of these synthetic oils under catalytic oxidation conditions is illustrated by the data in Table II. The laboratory oxidation test used was as follows: 25 cc. of the oil were heated in a test tube at 300° F. for 48 hours in the presence of 3 square inches of copper and 1 square inch of iron while bubbling in air at the rate of 5 liters per hour. At the end of the test, the neutralization number, viscosity at 210° F. and sludge were determined on the oxidized oil. The results obtained in this test with a Penna. S. A. E. 20 oil are also shown for comparison.

Table II

| Example Number | Hours on Test | Test Results | | Sludge |
|---|---|---|---|---|
| | | N. N. | Kin. Vis. at 210° F. | |
| II | 0 | 1.0 | 48.97 | |
| | 48 | 19.5 | 190.40 | Nil |
| IV | 0 | 2.3 | 8.65 | |
| | 48 | 6.4 | 11.14 | Nil |
| VIII | 0 | 0.8 | 9.45 | |
| | 48 | 2.8 | 12.73 | Nil |
| Penna. S. A. E. 20 Grade Oil | 0 | 0.0 | 8.60 | |
| | 48 | 4.3 | 10.61 | Nil |

The results shown in Table II illustrate the greater stability of the copolymers prepared from a maleic ester (Examples IV and VIII) over those prepared from a fumaric ester (Example II).

The stability of these oils may be further improved by the use of inhibitors as shown by the following results obtained in the laboratory oxidation test described above.

Table III

| Example Number | Hours | Test Results | | Sludge |
|---|---|---|---|---|
| | | N. N. | Kin. Vis. at 210° F. | |
| IV | 0 | 2.3 | 8.65 | |
| | 48 | 6.4 | 11.14 | Nil |
| IV+1.0% Inhibitor | 0 | 1.2 | 8.60 | |
| | 48 | 2.0 | 9.42 | Nil |

It is seen from the above that the inhibitor serves to retard the increase both in acidity and viscosity under the described test conditions. The inhibitor was the reaction product obtained by reacting pinene with phosphorus pentasulfide.

In order to show that copolymers prepared from maleic esters having chain lengths more than ten carbon atoms long, or having branched chains, are not as satisfactory for the purposes of this invention as are copolymers prepared from maleic esters having shorter straight chains, a series of tests were made and the results tabulated in Table IV.

Table IV

| Reactants | A. S. T. M. Pour Point, °F. | Kin. Vis. | | V. I. |
|---|---|---|---|---|
| | | at 100° F. | at 210° F. | |
| Vinyl acetate+di-n-decyl maleate | −30 | 89.60 | 13.85 | 138.2 |
| Vinyl acetate+di-n-dodecyl maleate | +25 | 129.90 | 18.68 | 136.3 |
| Vinyl acetate+di-n-octyl maleate | <−65 | 57.54 | 10.21 | 145.0 |
| Vinyl acetate+di-2-ethylhexyl maleate | <−65 | 69.20 | 9.68 | 123.0 |

All of the above copolymers were prepared using 0.25 mol of vinyl acetate per mol of the maleic ester. The high pour point shown by the dodecyl ester copolymer indicates quite definitely that the decyl ester is the upper limit of chain length which can be used to obtain an ester copolymer of low pour point. A comparison of the n-octyl maleate with the 2-ethylhexyl maleate on the basis of viscosity index shows that, for esters prepared from alcohols of the same number of carbon atoms, the straight chain ester yields a copolymer of higher viscosity index than does the branched chain ester. However, the properties of the branched chain ester copolymer are still satisfactory so that the use of such esters in the present invention should be included although not preferred.

What is claimed is:

1. A synthetic lubricating oil produced by reacting (1) one mol of a diester derived from a polybasic alpha, beta-unsaturated acid and a straight-chain primary aliphatic alcohol containing from 1 to about 18 carbon atoms, with (2) from about 0.05 mol to about 1.0 mol of a vinyl compound containing from 2 to about 18 carbon atoms and selected from the group consisting of vinyl esters of saturated fatty acids, alpha olefins, styrene and alpha methyl styrene, for a period of from about 1 to about 10 hours, at a temperature of from about 50° C. to about 150° C. and in the presence of an organic peroxide catalyst.

2. A synthetic lubricating oil produced by reacting (1) one mol of a diester derived from a polybasic alpha, beta-unsaturated acid and a straight-chain primary aliphatic alcohol containing not less than 4 nor more than 10 carbon atoms, with (2) from about 0.05 mol to 1.0 mol of a vinyl compound containing not more than 10 carbon atoms and selected from the group consisting of vinyl esters of saturated fatty acids, alpha olefins, styrene and alpha methyl styrene, for a period of from about 1 to about 10 hours, at a temperature of from about 50° C. to about 150° C. and in the presence of an organic peroxide catalyst.

3. A synthetic lubricating oil produced by reacting one mol of dinormal butyl maleate with from about 0.05 mol to 1.0 mol of vinyl acetate, for a period of from about 1 to about 10 hours, at a temperature of from about 50° C. to about 150° C. and in the presence of benzoyl peroxide.

4. A synthetic lubricating oil produced by reacting one mol of dinormal butyl maleate with from about 0.05 mol to 1.0 mol of styrene, for a period of from about 1 to about 10 hours, at a temperature of from about 50° C. to about 150° C. and in the presence of benzoyl peroxide.

5. A synthetic lubricating oil produced by reacting one mol of dinormal octyl maleate with from about 0.05 mol to 1.0 mol of ethylene, for a period of from about 1 to about 10 hours, at a temperature of from about 50° C. to about 150° C. and in the presence of benzoyl peroxide.

JOHN J. GIAMMARIA.

REFERENCES CITED

The following references are of record in the file of this patent:

UNITED STATES PATENTS

| Number | Name | Date |
| --- | --- | --- |
| 2,047,398 | Voss | July 14, 1936 |
| 2,294,259 | Peski et al. | Aug. 25, 1942 |
| 2,422,881 | Blair | June 24, 1947 |
| 2,430,564 | Gordon | Nov. 11, 1947 |
| 2,435,853 | Sutherland | Feb. 10, 1948 |